3,196,178
PROCESS FOR PURIFYING ACRYLAMIDE OR α-METHACRYLAMIDE
Everett J. Kelley, Moorestown, N.J., and Herbert R. Moody, Huntingdon Valley, Pa., assignors to Rohm & Haas Company, Philadelphia, Pa., a corporation of Delaware
No Drawing. Filed Mar. 28, 1962, Ser. No. 183,043
5 Claims. (Cl. 260—561)

This invention concerns a process for purifying methacrylamide by distilling it and condensing it as a solid in a liquid in which it has limited solubility. The same process can be applied to the purification of acrylamide and similar amides which present comparable problems in handling and purifying.

Methacrylamide may be prepared by such methods as reacting methacryloyl halide or methacrylic anhydride with ammonia, hydrolyzing methacrylonitrile, or reacting acetone cyanohydrin with sulfuric acid and neutralizing with ammonia. In all cases the reaction product is desirably purified. Acrylamide may be prepared by comparable procedures.

Suggested methods of purification which might be crystallization, sublimation, or distillation, have encountered difficulties because of the nature of acrylic amides. Methacrylamide is a solid at ordinary temperatures, melting at 108°–112° C., depending on purity and boiling under normal pressure at about 215° C. as estimated by extrapolation. Acrylamide melts at 85° C. and distills at about 210° C. (by extrapolation) under normal pressures.

Crystallization has proved to be inefficient, particularly as this method fails to remove color bodies which are encountered. In all methods as heretofore proposed there is a marked tendency for polymerization to occur, polymerization taking place especially rapidly when methacrylamide or acrylamide is in a liquid state, including being in a concentrated solution.

In sublimation considerable difficulty arises in supplying heat to the solid to be vaporized, also in collecting the vapors. When vapors are condensed on cool surfaces, whether from sublimation or distillation, hard crusts form. These render good heat transfer impractical. Such crusts or cakes must be broken from the surfaces and crushed. Also, if vapors are passed into tubes or the like, the condenser tends to plug up with solid. If the condenser surface is kept hot, aside from resulting thermal inefficiency, there arise difficulties from formation of polymer which interferes with heat transfer and causes a loss of product. Furthermore, because of design limitations on equipment such as scraped surface condensers, such equipment does not lend itself to economic design on a large scale.

In the process of this invention, methacrylamide or acrylamide is heated above the melting point in a still pot, vapors from the liquid acrylic amide are passed into a collecting liquid at a temperature below the melting point, which liquid is preferably relatively a poor solvent for methacrylamide or acrylamide at said temperature, whereby the amide condenses in said liquid as a solid in a divided state and, if desired, the solid is separated from the liquid.

The process is best conducted under reduced pressure to lower the temperature of distillation. It is desirable to operate at pressures which permit distilling below about 160° C., conveniently for methacrylamide between 110° and 150° C. pot temperatures. Pressures below about 125 mm. are then required and pressures vary from about 10 mm. to 80 mm. for the preferred temperatures. For acrylamide it is best to operate with pot temperatures of about 85° C. to about 135° C. or not over 150°. At 87° C. the vapor pressure is 2 mm., at 117° C. 10 mm., and at 135° C. 25 mm.

Vapor from the heated acrylic amide is passed into the collecting liquid maintained at a temperature below the melting point of methacrylamide or acrylamide. This liquid is an organic compound which is fluid, which is inert toward the amide, and which, at the temperatures at which it is used, permits solid amide to separate. Usually, such compound does not take up into solution more than about 25% of amide and preferably not over about 5% at the temperature of use. Under these conditions, the product is obtained as a finely divided solid, and polymerization does not take place. Also, the product is readily separable and the liquid saturated with amide is readily recycled.

If the liquid used is relatively low boiling, it may be evaporated from the solid after it has been filtered off or removed by centrifuging. If the liquid is not readily evaporated, it may be displaced with a liquid which is readily vaporized. For some purposes methacrylamide or acrylamide may be used in the collecting liquid or it may be mechanically separated from the bulk of the collecting liquid and then used even though liquid may adhere to the solid particles. The collecting liquid may be chosen with this object in mind.

There is thus available a wide selection of collecting liquids. In addition to the above-noted requirements that the liquid be unreactive toward the amide and permit separation of solid amide therefrom, it is desirable to choose liquids which, even though saturated with amide, are free-flowing at the temperatures at which they are used and in most cases liquids which do not impart an objectionable odor.

When the process is operated at reduced pressure, it is desirable to select a collecting liquid which has at the temperature at which the liquid is used a vapor pressure of no more than the vapor pressure of the acrylic amide at the temperature at which it is distilled. The vapor pressure of such liquid may, of course, be kept relatively low by controlling its temperature. Cooling permits use of inert collecting liquids which are readily evaporated from the solid particles of the distilled amide. In general, the collecting liquid may be used at a temperature between about −35° and 110° C., the particular temperature depending upon factors discussed above with respect to methacrylamide and between −35° C. and about 80° C. to 85° C. for acrylamide.

The collecting liquid may be a hydrocarbon, such as benzene, toluene, xylene, an aromatic petroleum distillate, an alkane or mixture of alkanes including gasolines and kerosenes, chlorinated hydrocarbons such as ethylene dichloride, trichloroethylene and trichloroethane, esters, such as ethyl acetate, n-butyl acetate, amyl acetate, butyl propionate, or dimethyl phthalate, ketones such as methyl ethyl ketone, methyl isobutyl ketone, or methyl hexyl ketone, or alcohols such as n-butyl or isobutyl alcohol, or isodecyl alcohol.

Some typical solubilities of methacrylamide are 3 g. per 100 cc. of methyl isobutyl ketone at 10° C., 4.1 g. per 100 cc. of methyl isobutyl ketone at 20° C., less than 4 g. per 100 cc. of methyl ethyl ketone at −18° C., 3.7 g. per 100 cc. of butyl acetate at 10° C., 1.5 g. per 100 cc. of ethylene dichloride at 10° C. and 1.2 g. per 100 cc. of the solvent at 0° C., less than 5 g. per 100 cc. of n-butyl alcohol at −10° C., less than 5 g. per 100 cc. of isodecyl alcohol at 20° C., about 0.2 g. per 100 cc. of xylene at 25° C., less than 1 g. per 100 cc. of toluene at 25° C., or less than 0.1 g. per 100 cc. of mineral spirits, kerosene, or n-decane at 25° C.

After the methacrylamide or acrylamide vapors are condensed as a finely particled solid in the collecting liquid, the resulting slurry or suspension of solid may be separated as by filtering or centrifuging. Collecting liquid adhering to the solid particles may be evaporated when the liquid has a suitable vapor pressure at temperatures below the melting point of the solid-liquid mixture. If the liquid is not thus readily volatilized, it may be displaced with a volatile liquid which is miscible therewith after which the latter is evaporated.

As an expedient in melting the crude acrylic amide in the still pot, an organic liquid may be mixed therewith. This improves heat transfer, prevents over-heating, and lessens the tendency for polymerization.

If desired, such liquid may be relatively non-volatile at the temperature of distillation, as in the case of a mineral lubricating oil. Choice of a liquid which forms an azeotrope with water permits removal of water from crude amide prior to its distillation. As is known, such organic solvents as ethanol, butanol, benzene, toluene, or xylene are often used for azeotroping purposes. It is particularly convenient to use in the still pot a liquid which aids in heat transfer, serves as an azeotroping agent, and also serves as a suitable collecting liquid.

It is desirable to mix with the crude amide a polymerization inhibitor, preferably one which is not readily volatilized if the product is to be as pure as possible. Typical, useful inhibitors for this purpose include diphenyl-p-phenylenediamine, di-β-naphthol, tannic acid, or a 6-phenyl fulvene.

Further details of the process of this invention are shown in the following examples which are presented by way of illustration and not for purposes of limitation.

*Example 1*

Crude methacrylamide, obtained in this case by heating acetone cyanohydrin in the presence of sulfuric acid, was isolated and freed of its chief impurities, ammonium sulfate and color, by distillation in the following way.

The equipment used comprised a 500 ml. 3-necked flask equipped with thermometer, stirrer, and a short-pass vapor arm lagged with electric heating tape and containing a glasswool filter plug. The vapor arm led to a one-liter 3-necked receiver flask containing about 700 ml. of the collecting liquid and equipped with stirrer and reflux condenser, at the top of which a vacuum line for the whole system was attached. The collecting liquid was cooled conveniently in an ice bath to 0° to 10° C.

The crude methacrylamide (100 g.) was charged to the distillation flask along with 30 g. of xylene and 0.2 g. of di-β-naphthol as polymerization inhibitor. The crude starting material contained 87 g. of methacrylamide and about 13 g. of ammonium sulfate. Xylene (700 ml.) was charged to the receiver, stirred, and cooled to 10° C. The stirrer in the still pot was then started and the methacrylamide mixture heated to about 110° C. to give a liquid pot. The vacuum was then applied gently and gradually. The xylene in the pot was distilled over, keeping the batch temperature at or above 110° C. In cases where wet crude amide was used, the water was removed at this time either by straight distillation or refluxing with a water separator in the system. The amide distilled over at a pot temperature of 115°–150° C. at 15–20 mm. (Hg) pressure. The amide was condensed and suspended in the rapidly stirred cold xylene at 10° C. The distillation was continued to dryness. The cold xylene-product slurry was filtered to recover the solid. The solid was dried at 50° C. and 30 mm. pressure to give 82 g. of essentially pure methacrylamide in the form of a white powder. The recovery was 94%.

The xylene slurry may be filtered continuously and recycled for a reduction in the amount of solvent required.

*Example 2*

The distillation apparatus described in Example 1 was modified by substitution of a wetted wall column for a condenser instead of the rapidly stirred collecting liquid in the receiver. The vapor arm was introduced near the top of a glass column down which a stream of mineral spirits was flowing. This lot of mineral spirits had a distillation range of 174° C. to 211° C. and was predominantly aliphatic in character.

Crude methacrylamide (93 g.) containing 85 g. of 100% methacrylamide was charged to the distilling flask along with 50 g. of mineral spirits and 0.5 g. of diphenyl-p-phenylenediamine as polymerization inhibitor. The batch was heated to 110° C. and vacuum was gradually applied to distill the mineral spirits and methacrylamide. The bulk of the amide distilled at a pot temperature of 118° C. at 12–15 mm. (Hg) pressure and was collected as solid in the mineral spirits. A total of 2800 mls. of mineral spirits at room temperature was fed to the wetted-wall condenser. The pot was heated to dryness at a final pot temperature of about 160° C. at 12 mm. (Hg) pressure. The product slurry was filtered and the solid vacuum dried at 50° C. to give 78 g. of pure white methacrylamide for a 90% recovery. The slurry may be filtered continuously and, collecting liquid, recycled.

*Example 3*

Crude wet methacrylamide (93 g.) containing 85 g. of pure amide was charged to the apparatus described in Example 2. Toluene (100 g.) was added thereto and the crude amide was dried by refluxing at 70–80° C./200 mm. with a water separator in the condensing system. The batch was then stripped to 100° C./50 mm. pot temperature. The wetted-wall condenser was attached and the amide distilled at pot temperature of 115°–155° C. at 15 to 5 mm. (Hg) pressure. Dimethyl phthalate (400 g.) at room temperature was gradually added to the top of the wetted-wall condenser during the 33-minute distillation period. The distillate was collected as a solid which formed a slurry in the dimethyl phthalate, the slurry being collected in a stirred and cooled receiver. A 9.5 g. distillation residue was obtained along with a total of 464 g. of methacrylamide-dimethylphthalate slurry. The slurry was filtered to recover 85 g. of solvent-wet product. The wet cake was washed twice with two 75 g.-portions of toluene and vacuum-dried at 50° C. and 40 mm. pressure to provide 65 g. of white crystalline methacrylamide; melting point 109–111° C. and bromine number 185 (calcd. 188). Recovery of pure amide was thus 76.5%. Analysis of the filtrate and toluene washings indicated an additional 11.5 g., for a total recovery of 90%.

*Example 4*

The purification is carried out as described in Example 1, except that the collecting liquid is n-butyl acetate which is cooled to −5° to −10° C. to avoid appreciable loss at the operating pressure of 10–15 mm. The distillate is collected as a solid in the butyl acetate.

The product is recovered by filtration at 10° C. The filtrate contains 4% by weight of methacrylamide. This amide may be recovered by distillation or by recycling the filtrate back to the system as collecting liquid.

*Example 5*

The purification is carried out as described in Example 2, except that ethylene dichloride is used as a collecting liquid and no solvent is added to the still pot. In this case it is desirable to cool the solvent in the condenser and receiver to about −30° C. (M.P. of ethylene dichloride is −35° C.) or near its melting point to avoid excessive solvent loss under the 10–15 mm. pressure used. The purified amide is recovered by filtration at room or lower temperatures. The filtrate contains 1.9 wt. percent of amide at 20° C. and 2.5 wt. percent at 30° C. The amide dissolved in the collecting liquid may be recovered by distillation or by recycling the filtrate back to the system.

*Example 6*

Purification is carried out as described in Example 1 or Example 2 with n-butyl alcohol as collecting liquid. In this case it is desirable to cool the solvent in the receiver or condenser to at least −10° C. to avoid solvent loss under 10–15 mm. pressure and to reduce the solubility of methacrylamide in the collecting liquid to less than 5%. The amide is recovered by filtration in the usual manner at −10° C. The filtrate at this temprature contains less than 5% of the amide and may be recycled.

*Example 7*

Purification is carried out as described in Example 1 or Example 2, but with use of methyl isobutyl ketone as collecting liquid. This liquid is cooled to at least 10° C. to avoid excessive loss under the 10–15 mm. pressure used for the distillation. The distilled methacrylamide is collected in a slurry which is filtered at 10° C. to separate the amide. The filtrate contains 3.6% of methacrylamide at 10° C. This may be recovered by distillation or the filtrate may be recycled.

*Example 8*

A crude acrylamide mixture containing 90% amide and 10% of ammonium sulfate was distilled in the equipment described in Example 2. A 500 ml.-portion of xylene was charged to the receiver, but no solvent was added to the still pot with the crude amide. Di-β-naphthol was used as inhibitor.

The batch was heated with stirring to 90° to form a molten mass and the pressure gradually reduced for distillation. Distillation appeared to start around a pot temperature of 105° C. at 22 mm., proceeded rapidly at 120° C. and 13 mm. pressure, and was completed at 140° C. and 12 mm. Pure, white acrylamide was recovered from the xylene by filtration and was vacuum-dried; melting point, 85–86° C.

By the process of this invention an amide, which has a high melting point and higher boiling point and which is sensitive to polymerization when heated, is distilled into a collecting liquid in which it is rapidly condensed to form discrete, solid particles of the purified amide. Hard crusts and cakes of solid are avoided with attendant difficulties. In contrast, the particles of purified amide are in a convenient form for separating, handling and using. Conditions promoting polymerization are absent. Vapor is rapidly chilled in the collecting liquid and no liquid phase of amide appears. Thus, the most stable form, i.e., solid, is rapidly attained and, since small particles of distillate are efficiently and rapidly cooled, polymerization is avoided. These desirable results are attained even though some amide is dissolved in the collecting liquid and is recycled with the liquid. Also, these favorable factors permit an economic design for large volume apparatus for accomplishing the favorable and efficient purification of readily polymerizable amides.

We claim:

1. A process for purifying an amide selected from the class consisting of acrylamide and α-methacrylamide comprising heating the amide until vapors are formed therefrom and then contacting said vapors with an inert, organic liquid wherein not more than about 5% of said amide dissolves in said liquid at the contacting temperature, said contacting temperature being below the melting point of said amide, whereby said amide is obtained from said vapors substantially directly as a finely divided solid in said liquid.

2. A process for purifying an amide selected from the class consisting of acrylamide and methacrylamide which comprises heating a said amide above its melting point,
vaporizing the molten amide under reduced pressure, and
contacting the resultant vapors and a collecting liquid at a temperature below 50° C., at which temperature said liquid has a vapor pressure not in excess of the said reduced pressure and said liquid dissolves not more than about 5% of said amide, whereby amide condenses as a solid in said liquid.

3. A process for purifying methacrylamide, which comprises heating methacrylamide above its melting point,
vaporizing molten methacrylamide between 110° and 160° C. under reduced pressure, and
contacting the resultant vapors and a collecting liquid at a temperature below 50° C. at which temperature said liquid has a vapor pressure not in excess of the said reduced pressure and said liquid dissolves not more than about 5% of methacrylamide, whereby methacrylamide condenses as a solid in said liquid.

4. A process according to claim 3 in which the solid in said liquid is separated.

5. A process for purifying methacrylamide which comprises heating methacrylamide above its melting point,
vaporizing molten methacrylamide between 110° and 150° C. under reduced pressure, and
contacting the resultant vapors and xylene at a temperature below about 50° C. and at which the xylene has a vapor pressure not in excess of the said reduced pressure, whereby methacrylamide condenses as a solid in the xylene.

References Cited by the Examiner

UNITED STATES PATENTS 2,587,210   2/52   Phillips et al. _____ 260—561

FOREIGN PATENTS 728,955   4/55   Great Britain.
805,029   11/58   Great Britain.

WALTER A. MODANCE, *Primary Examiner.*

IRVING MARCUS, NICHOLAS S. RIZZO, *Examiners.*